May 7, 1929.  O. H. PIEPER  1,711,539
DENTAL INSTRUMENT STRUCTURE
Filed Dec. 20, 1926
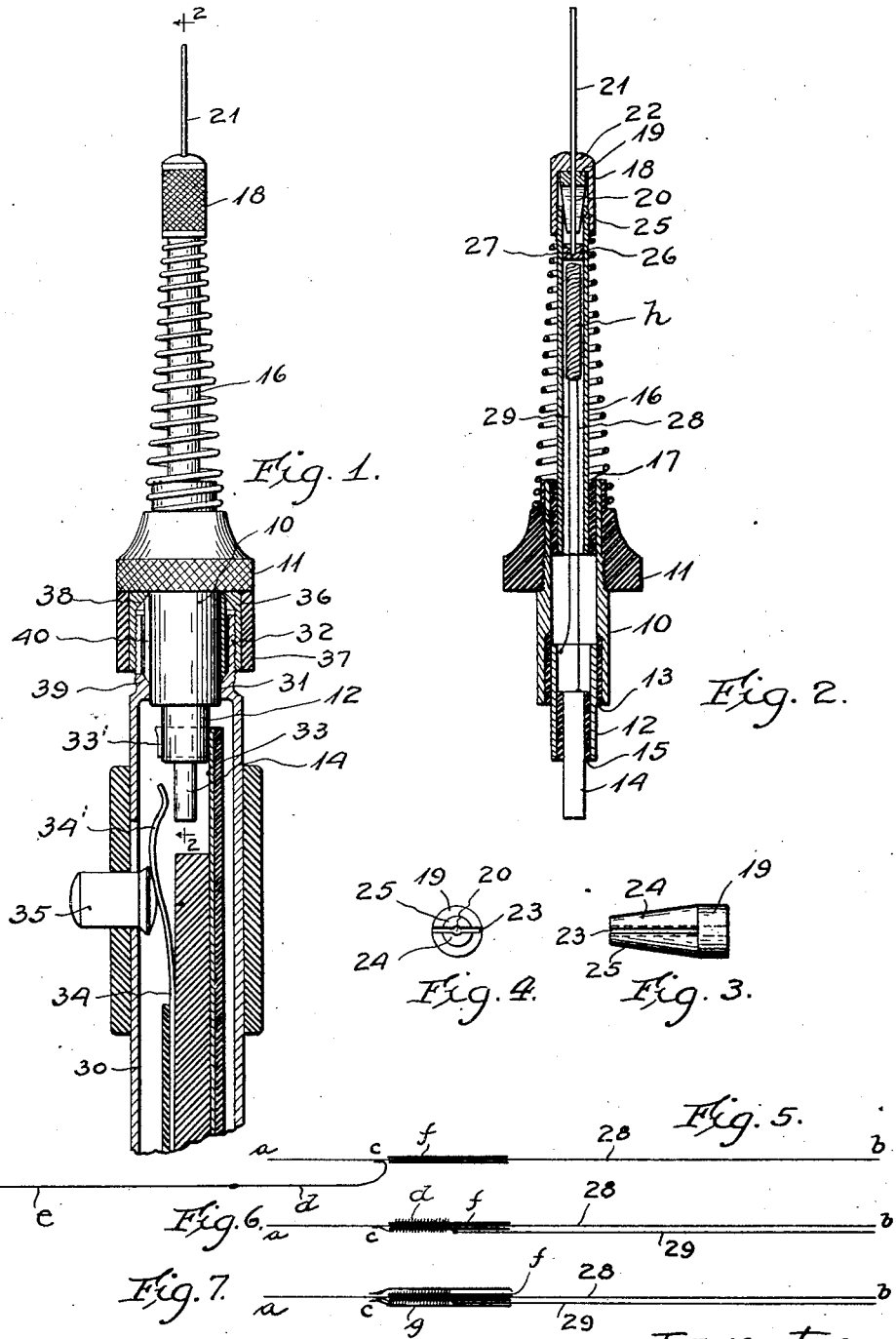
Inventor,
Oscar H. Pieper
By Brown, Boettcher + Dienner.
Attys.

Patented May 7, 1929.

1,711,539

UNITED STATES PATENT OFFICE.

OSCAR H. PIEPER, OF ROCHESTER, NEW YORK, ASSIGNOR TO HIMSELF AND ALPHONSE F. PIEPER, BOTH OF ROCHESTER, NEW YORK.

DENTAL INSTRUMENT STRUCTURE.

Application filed December 20, 1926. Serial No. 155,834.

My invention relates to dental instrument structures, particularly to electrically heated root canal drier instruments.

An important object of the invention is to provide improved structure and arrangement for the heating element or wire whereby the same may localize the heat. Another important object is to provide improved arrangement in the form of chuck mechanism for anchoring adjacent to the local heat of the heating element an instrument tip or point such as a wire for insertion into root canals to effect drying thereof, said chuck mechanism being capable of seating and securely holding the wire tip in place and permitting ready removal thereof.

The above and other features of the invention are incorporated in the structure disclosed on the drawing, in which:—

Figure 1 is a side elevational view of my improved instrument structure showing it seated in a switch handle whose upper end is shown in diametral section;

Figure 2 is a sectional view of the instrument structure on plane 2—2 of Figure 1;

Figure 3 is a side view of the chuck jaw;

Figure 4 is an end view of the chuck jaw; and

Figures 5, 6 and 7 show various steps in the forming of the heating coil.

The instrument structure comprises the body in the form of a metal tube 10 which at one end has secured or molded thereon insulating material to form a head or grip collar 11. The outer end of the tube 10 forms a plug for seating the instrument structure.

Telescoping a distance into and extending from the outer end of the tube 10 is the terminal sleeve 12 which is insulated from the tube by cement 13 which also securely holds the sleeve in place. Telescoping a distance within the outer end of the contact sleeve is the contact rod or pin 14 which is secured and insulated by cement 15.

In the upper end of the tube 10 is seated the operating point supporting tube 16 which is secured and insulated by the cement material 17. The end of the tube 16 is threaded to receive a chuck cap or shell 18. Cooperating with the ends of the tube is also the chuck jaw plug 19 whose tapered end 19' engages in the tube 10. The jaw plug 19 has the axial passageway 20 for reception of the operating point or needle 21, the chuck cap having the passageway 22 for the point. The chuck jaw member is slitted diametrally at its tapered end as indicated at 23 in order to form the opposed jaws 24 and 25 at opposite sides of the operating point receiving passageway 20, so that when the jaw plug is forced into the tube 16 by the engagement of the cap 18 therewith when the cap is screwed to the tube, the opposed jaws will be forced radially into clamping engagement with the operating point to hold it securely in position. To seat and assist in centering the operating point a block 26 is secured in the tube 16 a distance inwardly of the chuck end and has the pocket or hole 27 for receiving the end of the operating point. By means of this chuck mechanism different operating points may be readily secured for service.

Within the tube 16 directly behind the operating point supporting block 26 is the electric heating element $h$ whose terminals 28 and 29 extend through the tube 16 and tube 10 and connect respectively with the terminals 12 and 14. The heat from the heating element $h$ is conveyed to the block 26 which is of metal, and from their to the operating point. The heat is also conducted along the tube 16 and the chuck member to be delivered to the operating point, the outer end of the point becoming thus rapidly heated when current is conducted through the heating coil.

In Figures 5, 6 and 7 the manner of forming the coil is illustrated. A length of copper wire is indicated by the line A—B and soldered at one end to this wire at the point C is a length of resistance wire D which may be platinum, and to the other end of this resistance wire is secured another length of copper wire E. The wire A—B is placed in a winding machine and for a distance to the right of the point C insulation F is applied to the wire, which insulation may be in the form of asbestos yarn. The resistance wire D is now wound over the insulation F, as indicated in Figure 6, and then, as indicated in Figure 7, the insulation G which may also be in the form of asbestos yarn, is wound around the heating coil D and around the wire E, which was swung into parallelism with the wire A—B after the coil D was wound, the insulation G extending from the point C the whole length of the insulation F. After the insulation G has been applied the wire from C to A is snipped off and the heating element is now ready for use. As shown in Figure 2 and as has been described, the heating element is inserted to bring the heating coil into position immediately back of the block 26 from which the operating point 21 extends. The lead 28 (which is part of the wire A—B) and the lead 29 then extend through the tube 16 and plug tube 10 to be soldered to the terminals 12 and 14. The insulation G protects the heat coil from contact with the metal tube 16 while the leads 28 and 29 will be sufficiently rigid to keep themselves insulated from each other and from the various metal parts of the instrument. It is obvious, of course, that the wires forming the leads could have had insulation placed thereon before formation of the heating element.

The chuck arrangement described forms a very important feature of my invention as it permits the use of operating points or needles in the form of lengths of wire, such as platinum wire, and eliminates the need of special construction for operating points or needles. The chuck mechanism will securely and accurately hold the wire length rigidly in place and the wire will be rapidly heated by the heat delivered by the coil.

The instrument structure is, when used, supported in a suitable handle structure. On Figure 1, I have shown a handle structure such as is disclosed in my co-pending application Serial No. 136,501 filed September 20, 1926. It comprises the cylindrical shell 30 having the throat 31 at its upper end at the base of the neck 32, this neck being split to be radially contractible. Within the handle shell the conducting strip 24 terminates at its upper end in the socket or belt 33' which receives the contact sleeve 12 of the instrument structure whose plug tube 10 engages in the throat 31. The terminal strip 34 within the handle structure terminates in a switch leg 34' controlled by a button 35 to contact with the contact pin 14 of the instrument structure to include the heat coil in an electrical circuit.

The neck 32 of the handle structure is threaded on the exterior and engaged therewith is the bushing 36 which lines the insulating sleeve 37. At its upper end this bushing has the annular bevel shoulder 38 and the throat section of the handle has the bevel shoulder 39. Between these shoulders extends the split sleeve 40 whose ends are tapered in correspondence with the shoulders so that when the collar 29 is screwed down on the threaded neck of the handle the bushing 40 will be radially contracted to securely grip the plug tube 10 of the instrument structure and hold it securely to the handle structure. When the instrument is applied the collar 37 forms a continuation of the insulating grip end 11 of the instrument so that an extended heat insulated grip is provided for the operator.

Having described my invention, I claim as follows:—

1. An electrical heating element for dental instruments consisting of a lead wire, a length of resistance wire secured at one end to said lead wire to be in active engagement therewith and wound on said lead wire to form a heating coil, insulation insulating said coil from said lead wire, a second lead wire secured to the other end of said coil, and insulation wound around to enclose said coil and the adjacent part of said second lead wire.

2. An electrical heating element for dental instruments comprising a lead wire, a coil of resistance wire wound on said lead wire but insulated therefrom, one end of said coil being in electrical engagement with said lead wire, a second lead wire secured to the other end of said coil and extending parallel with the first lead wire, said lead wires being insulated from each other.

3. An electrical heating element for dental instruments comprising a lead wire, a coil of resistance wire wound on said lead wire but insulated therefrom, one end of said coil being in electrical engagement with said lead wire, a second lead wire secured to the other end of said coil, and insulation enclosing said coil and the adjacent part of said second lead wire.

4. In an electrical heating element for dental instruments, the combination of a lead wire, insulation on said wire, a coil of resistance wire wound around said lead wire at said insulation, one end of said coil being in electrical engagement with said lead wire, a second lead wire connected with the other end of said coil and extending parallel with said first lead wire, and insulation wound to enclose said coil and the adjacent part of said second lead wire.

5. An electrical heating element for dental instruments comprising, a lead wire, insulation wound upon the lead wire, a resistance wire secured at one end to one end of the lead wire and wound upon said lead wire over the insulation, and a second lead wire secured to the other end of the resistance wire.

In witness whereof, I hereunto subscribe my name this 16th day of December, 1926.

OSCAR H. PIEPER.